US 6,564,912 B1

(12) United States Patent
Koschinat

(10) Patent No.: US 6,564,912 B1
(45) Date of Patent: May 20, 2003

(54) BRAKE DISK

(75) Inventor: B. Hubert Koschinat, Hösbach (DE)

(73) Assignee: Otto Sauer Achsenfabrik of Keilberg, Bessenbach-Keilberg (DE)

( * ) Notice: Subject to any disclaimer, the term of this patent is extended or adjusted under 35 U.S.C. 154(b) by 0 days.

(21) Appl. No.: 09/642,588

(22) Filed: Aug. 22, 2000

(51) Int. Cl.$^7$ ............................................. F16D 65/12
(52) U.S. Cl. ........................... 188/218 XL; 188/18 A; 188/264 AA; 301/6.8
(58) Field of Search .................. 188/218 XL, 73.2, 188/264 AA, 264 A, 18 A, 250 B, 250 G, 251 R; 29/527.6, 416; 164/34, 98, 111, 612, 614; 192/107 R, 113.23, 113.26, 70.16; 301/6.8, 35.62, 6.3, 6.1, 105.1; 384/589, 510, 544; 403/335–337

(56) References Cited

U.S. PATENT DOCUMENTS

| | | | |
|---|---|---|---|
| 2,412,432 A | | 12/1946 | Tack |
| 4,948,437 A | | 8/1990 | Metzler |
| 5,107,966 A | | 4/1992 | Metzler et al. |
| 5,109,960 A | * | 5/1992 | Günther ............... 188/218 XL |
| 5,540,303 A | | 7/1996 | Bodin et al. |
| 5,568,846 A | | 10/1996 | Dagh et al. |
| 5,620,042 A | * | 4/1997 | Ihm |
| 5,823,303 A | * | 10/1998 | Schwarz et al. ...... 188/218 XL |
| 5,864,935 A | * | 2/1999 | Baumgartner et al. ........ 29/416 |
| 6,032,768 A | | 3/2000 | Ebbinghaus |
| 6,073,735 A | * | 6/2000 | Botsch et al. ......... 188/218 XL |
| 6,095,291 A | * | 8/2000 | Bertetti et al. ............. 188/18 A |
| 6,139,215 A | * | 10/2000 | Kühne et al. ............... 403/337 |
| 6,152,270 A | * | 11/2000 | Giorgetti ............... 188/218 XL |
| 6,267,209 B1 | * | 7/2001 | Gross et al. .......... 188/218 XL |

FOREIGN PATENT DOCUMENTS

| | | | |
|---|---|---|---|
| DE | 1 575 748 | | 1/1970 |
| DE | 2033033 | | 1/1972 |
| DE | 2235627 | | 1/1974 |
| DE | 2728335 | * | 1/1978 |
| DE | 43 21 930 | | 1/1995 |
| DE | 4436653 A1 | | 4/1995 |
| DE | 199 18 667 | | 10/2000 |
| DE | 19929390 | * | 2/2001 |
| EP | 0 077 137 | | 4/1983 |
| EP | 0 933 551 | | 8/1999 |
| EP | 1065403 | * | 1/2001 |
| GB | 1323832 | * | 7/1973 |
| WO | 9740285 | * | 10/1997 |
| WO | 98/25045 | | 6/1998 |

* cited by examiner

Primary Examiner—Douglas C. Butler
(74) Attorney, Agent, or Firm—Wenderoth, Lind & Ponack, L.L.P.

(57) ABSTRACT

A brake disk for disk brakes, in particular of land vehicles, has a friction ring received by a support section, formed, for example, by a portion of a wheel hub. The support section has an out-of-round outer formation on which the friction ring is seated torsionally tight with a centric opening of complementary inner out-of-round formation. The friction ring, and preferably also the support section, is comprised of cast metal and the friction ring is cast onto the prefabricated support section to form a cast connection between the friction ring and the support section. The cast connection between the friction ring and the support section is such that upon an initial heating of the brake disk the cast connection becomes ruptured and the friction ring becomes separated from the support section.

14 Claims, 2 Drawing Sheets

BRAKE DISK

BACKGROUND OF THE INVENTION

(1) Field of the Invention

The invention relates to a brake disk for disk brakes, in particular of land vehicles, with a friction ring received by a support section formed by, for example, a portion of a wheel hub, wherein the support section has an out-of-round outer formation on which the friction ring is seated torsion-tight with a centric opening of complementary out-of-round inner formation.

(2) State of Prior Art

Such a brake disk is known from EP-B-0 642 632. Therein is proposed a wheel hub and such a brake disk configuration for a vehicle wheel, which comprises a hub section borne rotatably on an axle end by a bearing device, a brake disk support connected with the hub section, a brake disk rotatably fastened on the brake disk support and a disk-form support, which is fastened on the hub by a screw-type connection and to which a wheel rim can be screwed. The brake disk support is developed radially outside of the screw-type connection unitarily with the disk-form support, wherein the brake disk support does not have a circular outer formation on which a brake disk with an opening having a congruent inner formation is rotatably fastened. Thereby a wheel hub and brake disk configuration is to be provided in which a common screw-type or welding connection for the brake disk and the brake disk support can be avoided. The known configuration is in particular disadvantageous since high fabrication expenditures, high accuracy of fit in the region of the non-circular formations and an additional securement of the brake disk on the brake disk support against axial displacement must be provided.

SUMMARY OF THE INVENTION

It is the task of the present invention to propose a brake disk of the above described type in which, with simple means, a nonuniform heat distribution in the friction ring, and thus a distortion of the friction ring, so-called "canopying-out" of the friction ring, at the temperatures occurring during braking and heat transfer onto the wheel bearing are avoided. With the invention, in particular, on the other hand, undesirable wear of the friction ring and stress fractures in the friction ring are to be avoided and, on the other hand, the shortening of the service life of the lubrication oil, present in the wheel bearing and/or bearing parts of synthetic material, are to be counteracted.

This task is essentially solved according to the invention in the case of a brake disk of the above described type by the friction ring, and preferable also the support section, comprising cast metal with the friction ring being cast onto the prefabricated support section.

It was found that the cast connection according to the invention between the friction ring and the support section, in particular if the latter also comprises cast metal, is ruptured upon first heating of the brake disk, and thus during the first braking process, such that the friction ring is separated from the support section. In this way a brake disk which, relative to the prior art is simple in structure and mounting, and in which, due to the separation gap generated between the friction disk and the support section, excessive stress, and thus stress fractures, in the friction ring, even at high braking power, for example in the field of trucks, are avoided. Moreover, due to the separation gap formed, heat flow from the friction ring to the support section, and thus the wheel bearing, is prevented.

With different constructions the support section can be formed, for example, by a pot-like hub section of the brake disk itself, a bearing hub on which a wheel flange can be fastened, or by a unitary wheel flange hub, wherein the last variant is especially cost-effective. In case the friction ring is changed, the wheel hub (possibly with the bearing) can also be exchanged, such that a new manufacturer's warranty can be issued for the entire assembly. If the support section is formed by a unitary wheel flange hub, a separate wheel flange screw-type connection is omitted, with corresponding weight saving.

When using a brake disk with a separate pot-like hub section, the hub section can comprise, for example, a high-strength metal material and the friction ring a specific high-temperature disk material.

The out-of-round formation of the support section is formed according to a special inventive concept by ribs or protuberances, preferably force-framing, protuberances. The number of ribs or protuberances can be varied according to the technical requirements. Here, as well as in the case with a general out-of-round shape, no special fabrication precision is required since, due to the casting of the friction ring onto the out-of-round shape, for example in the form of ribs or protuberances, irregularities are per force compensated. Force-framing protuberances have the advantage that they extend on all sides into the opening margin of the friction ring, such that not only the reliable transmission of torques but also a securement against axial displacement of the friction ring on the support section is ensured.

In further development of the inventive concept, the support section in the region of the out-of-round formation can be equipped with holes or slits for air circulation. If the friction ring is structured such that it is solid, the holes or slits can be omitted.

Further goals, characteristics, advantages and application feasibilities of the present invention are evident in the following description of embodiment examples in conjunction with the drawing. All described and/or graphically represented characteristics, by themselves or in any combination form the subject matter of the invention, independently of their recapitulation in individual claims or their reference back.

DETAILED DESCRIPTION OF THE PREFERRED EMBODIMENTS

Figures 1A, 1B:
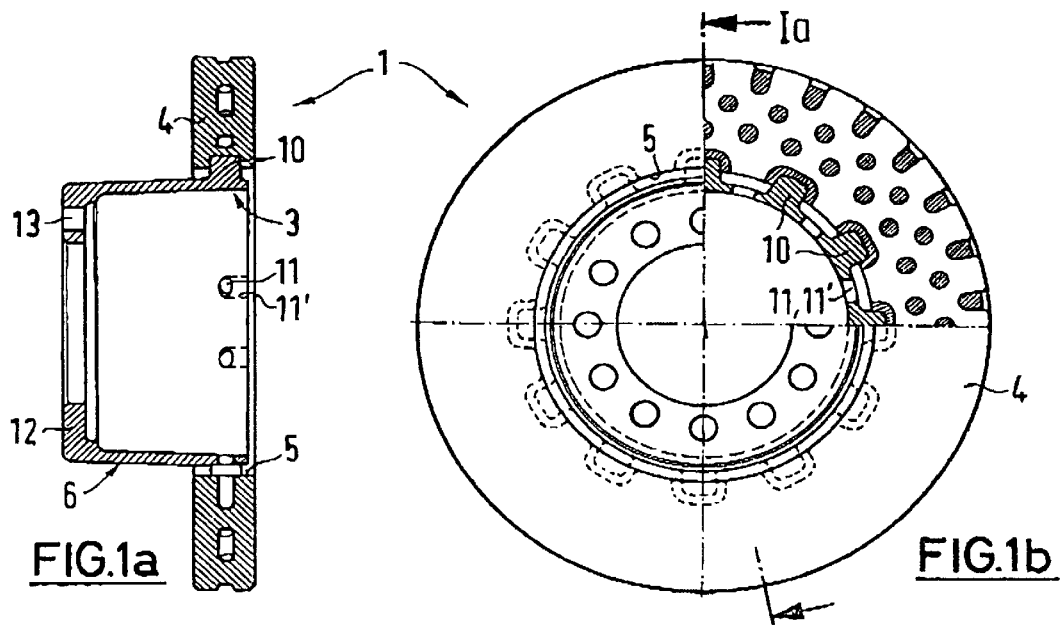
FIGS. 1a and 1b, in radial section and in a partially sectioned view, show a brake disk comprising the invention according to a first embodiment with a pot-like bearing section, FIGS. 2a and 2b, also in radial section and in partially sectioned view, show a brake disk comprising the invention according to a different embodiment, wherein the brake disk is received on a bearing hub.
Figure 4:
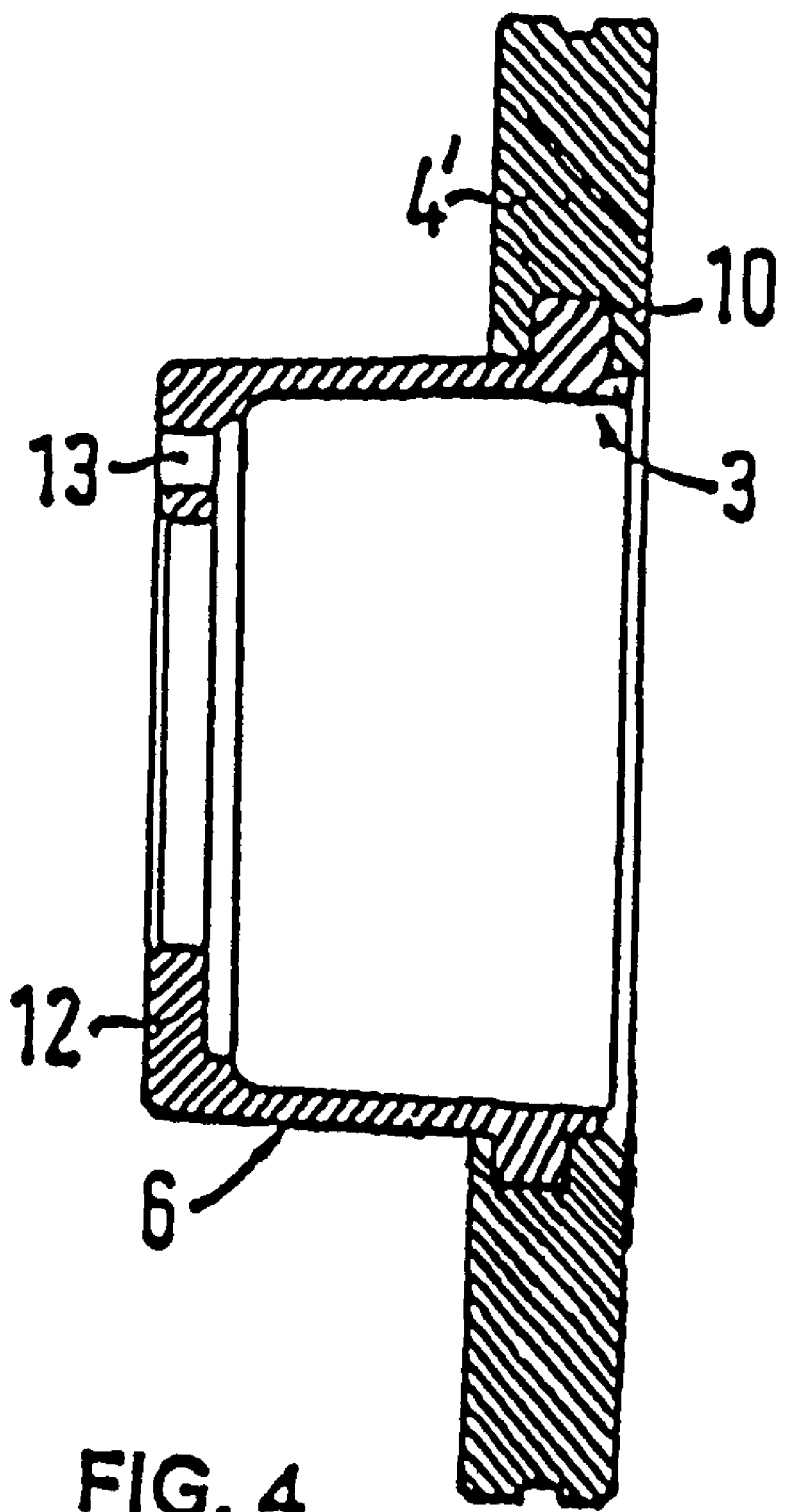
FIG. 4 is a view similar to that of FIG. 1a, but showing a solid friction ring in accordance with a second embodiment.

An internally ventilated brake disk 1 according to FIGS. 1a and 1b, which is intended for disk brakes of, in particular, of land vehicles, has a pot-like hub section 6, which, on the one hand, is adapted for a screw-type connection with a (not shown) wheel hub and, on the other hand, is adapted for connection with a friction ring 4 having an opening 5. Alternatively, as shown in FIG. 4, a solid friction ring 4' may be used in place of the ventilated friction ring 4.

For the purpose of connection with the wheel hub, the pot-like hub section 6, at its end facing away from the friction ring 4, comprises a radial inner flange 12 with holes 13 distributed over its periphery for receiving axially parallel connection bolts. On a support section 3 facing the friction ring 4 the hub section 6 has force-framing protuberances 10. The friction ring 4 is cast on the region of the support section 3 of the prefabricated pot-like hub section 6. The hub section 6 of the brake disk 1, as well as the friction ring 4, can comprise cast metal. The support section 3 is further provided with holes 11 or slits 11', which improve the air circulation in the internally ventilated friction ring 4. In the event a solid friction ring 4 is used, the holes 11 or slits 11' can be omitted.

Figures 2A, 2B:
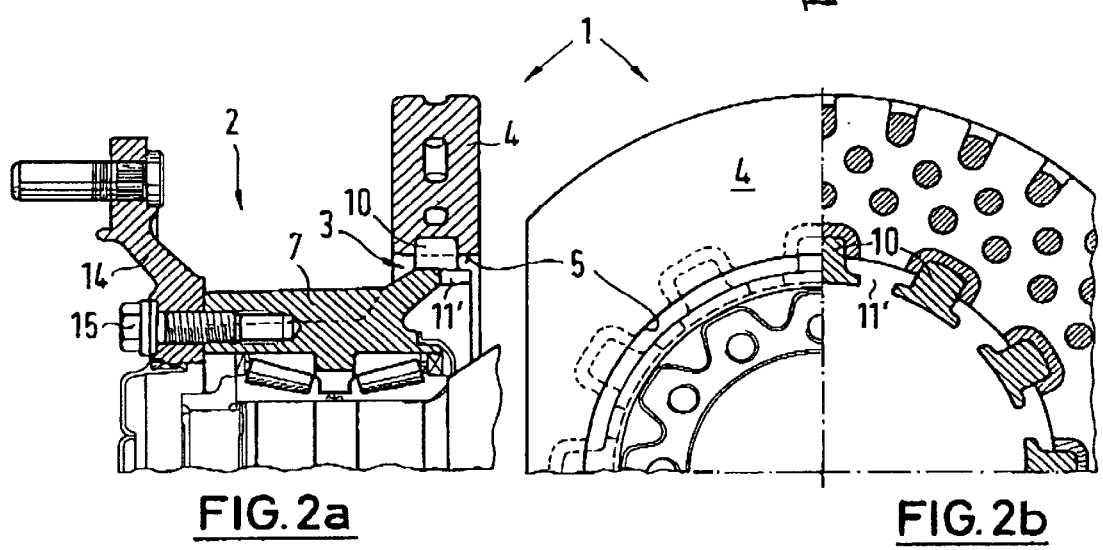

In the embodiment of FIGS. 2*a* and 2*b* the brake disk 1 is a mere planar friction ring 4, which is cast onto the support section 3 of a bearing hub 7. Toward the outside the wheel flange 14 of wheel hub 2 can adjoin the bearing hub 7 via bolts 15.

Figure 3:
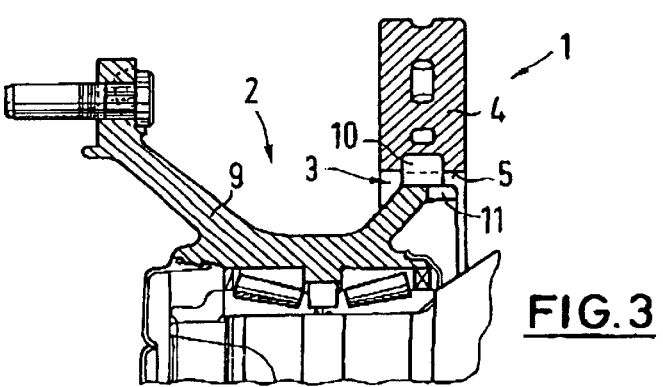
FIG. 3 is a representation similar to that of FIG. 2a of a further embodiment of the invention, wherein the brake disk is received on a unitary wheel flange hub.

In the embodiment depicted in FIG. 3 the support section 3, onto which the friction ring 4 is cast such that it partially flows around the force-framing protuberances 10, is a unitary wheel flange hub 9, which serves for direct mounting of the vehicle wheel.

The cast connection according to the invention between the friction ring 4 or 4' and the support section 3 is ruptured upon first heating of the brake disk 1, and thus during the first braking process, the friction ring 4 or 4' is separated from the support section 3. Specifically, the friction ring 4 or 4' comprises cast metal cast onto the support section 3 to form a cast connection between the friction ring 4 or 4' and the support section 3, with the cast connection between the friction ring 4 or 4' and the support section 3 being such that upon an initial heating of the brake disk 1 the cast connection becomes ruptured and the friction ring 4 or 4' becomes separated from the support section 3.

What is claimed is:

1. A brake disk, comprising:

a prefabricated bearing hub including a support section having an out-of-round outer formation; and a friction ring received by said support section and having a central opening with an inner out-of-round formation complementary to said out-of-round formation of said support section and with which said friction ring is seated torsionally tight on said out-of-round outer formation of said support section;

wherein said friction ring comprises cast metal cast onto said support section to form a cast connection between said friction ring and said support section, with said cast connection between said friction ring and said support section being such that upon an initial heating of the brake disk said cast connection becomes ruptured and said friction ring becomes separated from said support section.

2. The brake disk of claim 1, wherein said prefabricated bearing hub constitutes part of a unitary wheel flange hub.

3. The brake disk of claim 1, wherein said support section is formed by a hub section comprising a high-strength metal material and said friction ring comprises a specific high-heat disk material.

4. The brake disk of claim 3, wherein said out-of-round formation of said support section is formed by ribs or protuberances distributed over the outer periphery of said support section.

5. The brake disk of claim 2, wherein said out-of-round formation of said support section is formed by ribs or protuberances distributed over the outer periphery of said support section.

6. The brake disk of claim 2, wherein said support section comprises holes or slits in the region of said out-of-formation for air circulation.

7. The brake disk of claim 2, wherein said friction ring is solid.

8. The brake disk of claim 1, wherein said support section is formed by a hub section comprising a high-strength metal material and said friction ring comprises a specific high-heat disk material.

9. The brake disk of claim 8, wherein said out-of-round formation of said support section is formed by ribs or protuberances distributed over the outer periphery of said support section.

10. The brake disk of claim 1, wherein said support section is formed by a hub section comprising a high-strength metal material and said friction ring comprises a specific high-heat disk material.

11. The brake disk of claim 10, wherein said out-of-round formation of said support section is formed by ribs or protuberances distributed over the outer periphery of said support section.

12. The brake disk of claim 1, wherein said out-of-round formation of said support section is formed by ribs or protuberances distributed over the outer periphery of said support section.

13. The brake disk of claim 1, wherein said support section comprises holes or slits in the region of said out-of-formation for air circulation.

14. The brake disk of claim 1, wherein said friction ring is solid.

* * * * *